(12) United States Patent
Kedalagudde et al.

(10) Patent No.: US 11,265,794 B2
(45) Date of Patent: Mar. 1, 2022

(54) MESSAGE SPLITTING FOR MULTI-RAT TRANSMISSION

(71) Applicant: Intel IP Corporation, Santa Clara, CA (US)

(72) Inventors: Meghashree Dattatri Kedalagudde, Portland, OR (US); Ana Lucia A. Pinheiro, Hillsboro, OR (US); Dave Cavalcanti, Portland, OR (US); Ranganadh Karella, San Diego, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/473,688

(22) PCT Filed: Mar. 29, 2017

(86) PCT No.: PCT/US2017/024725
§ 371 (c)(1),
(2) Date: Jun. 26, 2019

(87) PCT Pub. No.: WO2018/182591
PCT Pub. Date: Oct. 4, 2018

(65) Prior Publication Data
US 2020/0015144 A1     Jan. 9, 2020

(51) Int. Cl.
*H04W 40/02*     (2009.01)
*H04W 76/16*     (2018.01)
(Continued)

(52) U.S. Cl.
CPC ............. *H04W 40/02* (2013.01); *H04W 4/40* (2018.02); *H04W 76/16* (2018.02); *H04W 88/06* (2013.01)

(58) Field of Classification Search
CPC ....... H04W 40/02; H04W 76/16; H04W 4/40; H04W 88/06; H04W 76/15; H04W 4/08; H04W 48/18
See application file for complete search history.

(56) References Cited

U.S. PATENT DOCUMENTS 8,891,438 B2 * 11/2014 Ahmadi ................ H04L 5/0035
 370/325
2003/0079023 A1 * 4/2003 Stefansson .............. H04L 67/04
 709/227
(Continued)

FOREIGN PATENT DOCUMENTS

EP       2518958 A1    10/2012
WO    2015/060848 A1    4/2015

OTHER PUBLICATIONS

International Search Report dated Sep. 28, 2017 for International Application No. PCT/US2017/024725.
(Continued)

*Primary Examiner* — Donald L Mills
(74) *Attorney, Agent, or Firm* — 2SPL Patent Attorneys PartG mbB; Yong Beom Hwang

(57) ABSTRACT

A method includes identifying, within a message, first data comprising a priority section and second data comprising a non-priority section. A priority message is generated that includes the first data. The priority message is transmitted using a priority radio access technology (RAT). A non-priority message is generated that includes the second data. The non-priority message is transmitted using a non-priority RAT.

23 Claims, 5 Drawing Sheets

(51) Int. Cl.
*H04W 4/40* (2018.01)
*H04W 88/06* (2009.01)

(56) References Cited

U.S. PATENT DOCUMENTS

| | | | | |
|---|---|---|---|---|
| 2005/0065716 | A1* | 3/2005 | Timko | G01S 19/16 |
| | | | | 701/29.3 |
| 2012/0176905 | A1* | 7/2012 | Martin | H04L 51/38 |
| | | | | 370/238 |
| 2012/0269059 | A1* | 10/2012 | Gupta | H04W 8/082 |
| | | | | 370/229 |
| 2014/0071925 | A1* | 3/2014 | Liu | H04W 28/08 |
| | | | | 370/329 |
| 2015/0063099 | A1* | 3/2015 | Sadek | H04W 52/244 |
| | | | | 370/229 |
| 2015/0201427 | A1* | 7/2015 | Lee | H04W 74/02 |
| | | | | 455/450 |
| 2016/0174122 | A1* | 6/2016 | Sorrentino | H04W 36/22 |
| | | | | 370/331 |
| 2017/0366467 | A1* | 12/2017 | Martin | H04L 47/2433 |
| 2018/0014317 | A1* | 1/2018 | Gulati | H04L 5/0005 |
| 2018/0019942 | A1* | 1/2018 | Liang | H04L 45/30 |
| 2018/0176800 | A1* | 6/2018 | Sunay | H04W 72/04 |
| 2019/0098471 | A1* | 3/2019 | Rech | G08G 1/162 |
| 2019/0098640 | A1* | 3/2019 | Holakouei | H04L 1/1835 |
| 2019/0150082 | A1* | 5/2019 | Kedalagudde | H04W 4/46 |
| | | | | 370/329 |
| 2019/0159237 | A1* | 5/2019 | Wei | H04W 4/40 |
| 2019/0174391 | A1* | 6/2019 | Ode | H04W 76/27 |
| 2019/0174547 | A1* | 6/2019 | Khoryaev | H04L 47/11 |
| 2019/0364492 | A1* | 11/2019 | Azizi | H04W 92/045 |
| 2020/0019176 | A1* | 1/2020 | Meifang | G08G 1/161 |
| 2020/0288341 | A1* | 9/2020 | Karella | H04L 43/062 |

OTHER PUBLICATIONS

"FS_eV2X RAT selection based on KPIs." Source: Intel Corporation. Agenda Item: 9.2. 3GPP TSG-SA WG1 Meeting #75, San Francisco, USA Aug. 22-26, 2016. S1-162355. 2 pages.

"5G Automotive Vision." 3GPP Draft; 5G_White_Paper_Automotive, 3rd Generation Partnership Project (3GPP). Nov. 30, 2015. 68 pages.

"Considerations of V2X implications to RAN operation." Source: Nokia Networks. Agenda item: 7.11. 3GPP TSG-RAN WG2 Meeting #91 bis, Malmo, Sweden, Oct. 5-9, 2015. R2-154147. 8 pages.

3rd Generation Partnership Project; Technical Specification Group Services and System Aspects; Study on enhancement of 3GPP Support for 5G V2X Services (Release 15). 3GPP TR 22.886 V15.1.0 (Mar. 2017). 3GPP Advanced Pro LTE. 58 pages.

International Preliminary Report on Patentability dated Oct. 1, 2019 for International Application No. PCT/US2017/024725.

* cited by examiner

MESSAGE SPLITTING FOR MULTI-RAT TRANSMISSION

This application is a National Phase entry application of International Patent Application No. PCT/US2017/024725 filed Mar. 29, 2017, entitled "MESSAGE SPLITTING FOR MULTI-RAT TRANSMISSION" in the name of Meghashree Dattatri Kedalagudde et al. and is hereby incorporated by reference in its entirety.

FIELD

The present disclosure relates to the field of wireless communications and in particular to applications including, but not limited to, applications related to the Internet of Things (IoT) and Vehicle to Everything (V2X), Cellular, Multi-Fire, WiFi, WiGig, sensor networks, mesh networks, and so on.

BACKGROUND

IoT and V2X applications typically involve wireless communications between devices without human intervention. Cooperative driving is one example of an IoT application in which where vehicles transmit messages to share their intentions with other nearby vehicles, roadway infrastructure, or even pedestrians. Such information is used by automated driving applications to enable accurate prediction of what others will do in the near future, and by doing so optimize their own decisions. In synchronized cooperation, autonomous vehicles exchange messages and synchronize their planned trajectories to optimize driving patterns.

Modern devices are capable of radio communication using one or more radio access technologies (RAT). A RAT is a communication protocol according to some standard. Examples of RATs include cellular RAT such as LTE and 5G and 802.11p based "radio" RATs such as DSRC. Communication systems based on the different RAT may be operating on the same spectrum bands or different spectrum bands.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Figure 1A:
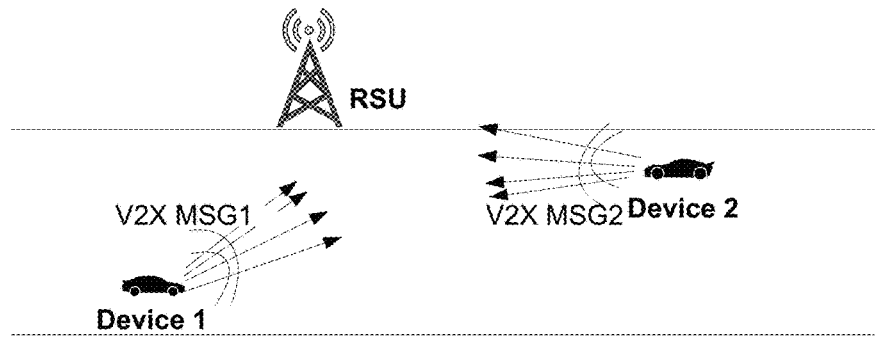
FIG. 1A depicts V2X communication between two groups of vehicles and a roadside service unit (RSU) in which a single RAT is used by each vehicle to transmit a V2X message.

During synchronized coordination of driving (e.g., platoon or convoy mode) vehicles form groups with reduced distance among them to improve traffic and fuel efficiency while avoiding collisions. Such higher automation and cooperation levels require data exchange between vehicles with low latency and high reliability. Therefore, efficient and reliable group communication functionality among closely proximate devices is important to enable advanced autonomous driving applications.

In many V2X applications, V2X messages which facilitate coordinated driving and collision avoidance should be transmitted with very high reliability. Advanced platooning, advanced driving and cooperative collision avoidance (CoCA) are examples of applications that rely on the exchange of V2X messages between vehicles and/or between vehicles and RSUs with extremely high reliability. For the purposes of this description the term V2X message will be used as shorthand for any message that is sent by some or all vehicles or devices in a group to facilitate cooperative driving or collision avoidance.

Examples of V2X messages include a basic safety message (BSM), a signal phase and timing message (SPaT), signal phase and timing with map (SPaT/MAP) message, a probe message, and a roadside alert (RSA) message. The BSM and SPaT/MAP messages will be described in more detail with reference to FIGS. 2A-2C. The probe message collects, stores, and forwards sensor data from along a segment of roadway from the vehicle. The RSA message is used to alert other vehicles about safety related events, such as roadway hazards. Of course, many other V2X messages are in use and fall within the scope of the present disclosure.

The term "vehicle" will be used interchangeable with the term "device" as the message splitting for multi-RAT transmission techniques will be described in the context of cooperative driving. It is to be understood that the message splitting for multi-RAT transmission described herein may be performed by any device, such as any mobile communication device, wireless communication device, user equipment (UE) device, evolved node B (eNB), access point (AP), base station, and so on, where beneficial. Further the message splitting for multi-RAT transmission described herein may be performed on any type of message that could benefit from splitting for multi-RAT transmission, not just V2X messages.

Device-to-device communication, which is the "direct" exchange of messages or data between devices without intervention by an intermediate node, such as an access point or eNB, is an attractive option for providing efficient and reliable group communications for many reasons. For example, in many instances device-to-device communication can be performed with reduced latency as compared to communication via an eNB. Further, device-to-device communication can be performed when connection with an eNB is not possible (e.g., in a tunnel or region without cell coverage), increasing reliability. Device-to-device communication can be cellular based (e.g., LTE D2D and 5G LTE) and non-cellular based (e.g., DSRC and other 802.11 p based radio). Cellular communication, as used herein, refers to communication which involves an access point or evolved node B (eNB) as relay between devices. Any of these different types of communication RATs may be utilized in the multi-RAT transmission techniques described herein.

Device-to-device communication functionality is supported in many devices by long term evolution (LTE) proximity services (ProSe). Device-to-device communication is supported over dedicated resource pools, which are preconfigured or allocated by the eNB. Access to data resources within a resource pool (Physical Sidelink Shared Channel (PSSCH)) can be controlled or assigned by the eNB (mode 1) or acquired autonomously by the device (mode 2) using contention within control resources (Physical Sidelink Control Channel (PSCCH)). From the physical layer (PHY) perspective, device data transmissions are broadcast, i.e., all devices within range are potential receivers. Thus, both unicast and one-to-many communications are possible.

One modern device-to-device communication protocol is dedicated short-range communication (DSRC). DSRC is a short to medium range communication service in the range of 5.850 to 5.925 GHz in North America. DSRC supports RSU to vehicle and vehicle to vehicle communication. DSRC typically provides fairly high data transfer rates with minimal latency and has a range of about 1000 meters. DSRC data rates range between 6 to 27 Mbps. DSRC has a safety control channel dedicated to V2X messages. Rather than requesting resources, as is done with cellular based D2D (e.g., LTE D2D and 5G D2D) communication, in DSRC the device contends for the DSRC channel with other devices and applications. DSRC encompasses the 802.11p radio access technology and the higher layers of the stack as defined by the IEEE 1609 suite of protocols.

While radio based (e.g., DSRC) communication has many attractive aspects for communicating V2X messages, in some situations, it may be beneficial for messages to be transmitted using cellular radio device-to-device technology in which the message is transmitted using resources allocated to the device by the cellular network. In other situations it may be beneficial to transmit a message by way of cellular communication, using a relay node such as an eNB. Cellular radio technologies that use a relay node include LTE-V or 5G. For example, cellular radio communication (either D2D or using an eNB as relay node) is often better suited for data-intensive messages because cellular radio often guarantees a minimum performance whereas DSRC has to contend for the channel, meaning that performance may degrade during busy periods.

In the future, V2X communications may be supported by a combination of cellular and radio based radio access technologies (RATs). Each RAT may provide different levels of service in terms of throughput, latency, and reliability. The V2X applications will support a variety of V2X messages, which may include variable size information elements. For example, a BSM may include optional information elements (IE) such as the BSM "Part 2" elements or fields. The optional information elements provide detailed information about a vehicle. The optional information elements may be "nice to have", however, in some instances transmission of the entire V2X message including the optional elements may be hindered by the large quantity of data encoding the optional information elements. This may result in degradation of communication of more important aspects of the V2X message.

FIG. 1A illustrates a V2X scenario where two vehicles, device 1 and device 2, transmit V2X messages MSG 1 and MSG 2, respectively to ensure that the other vehicles and RSUs are aware of the vehicle's intentions/next actions as they cross each other on the roadway. Each vehicle uses a selected RAT, which may be default RAT, to transmit the V2X message. Depending on the radio conditions, transmission traffic, channel conditions, the content and size of the message, and so on, the use of the selected RAT may not provide optimal communication of the V2X message.

Described herein are devices, methods, and techniques for message splitting for multi-RAT transmission in which different sections or parts of a V2X message are transmitted using a different RAT that is selected based on the content of the message sections. In this manner, multiple RATs can be leveraged to more effectively and efficiently deliver V2X messages according to the capabilities of the devices as well as the content of the messages.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "circuitry", and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

In the following description, a plurality of details is set forth to provide a more thorough explanation of the embodiments of the present disclosure. However, it will be apparent to one skilled in the art that embodiments of the present disclosure may be practiced without these specific details. In other instances, well-known structures and devices are shown in block diagram form rather than in detail in order to avoid obscuring embodiments of the present disclosure. In addition, features of the different embodiments described hereinafter may be combined with each other, unless specifically noted otherwise.

Figure 1B:
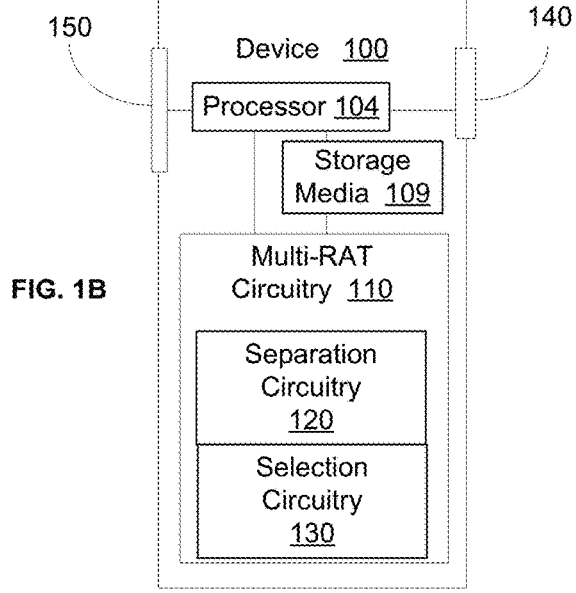
FIG. 1B depicts an exemplary user equipment (UE) device that is configured to participate in message splitting for multi-RAT transmission.

FIG. 1B illustrates an exemplary architecture for a device 100 that supports message splitting for multi-RAT transmission by devices. The device 105 includes a processor 104, storage media 109, and a multi-RAT circuitry 110 that instructs a processor of the device or otherwise controls the device 100 to transmit two different messages, each including different sections of a V2X message, using different RATs. As used herein, the term "circuitry" may refer to, be part of, or include an Application Specific Integrated Circuit (ASIC), an electronic circuit, a processor (shared, dedicated, or group, e.g., processor 104), and/or memory (shared, dedicated, or group, e.g., storage media 109) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The processor 104 may be configured to cooperate with the storage media 109 and/or the multi-RAT circuitry 110 to provide higher-layer operations that include generating, processing, and transmitting signals encoding messages. The processor 104 may be configured to provide a geographical identifier in the various messages transmitted by the device 100 as described herein. The processor 104 may include one or more single-core or multi-core processors. The processor 104 may include any combination of general-purpose processors and dedicated processors including, for example, digital signal processors (DSPs), central processing units (CPUs), microprocessors, memory controllers (integrated or discrete), etc.

The storage media 109 may be used to load and store data or instructions (collectively "logic") for operations performed by the processor 104. The storage media 109 may include any combination of suitable volatile memory and non-volatile memory. The storage media may include any combination of various levels of memory/storage including, but not limited to, read-only memory (ROM) having embedded software instructions (e.g., firmware), random access memory (e.g., dynamic random access memory (DRAM)), cache, buffers, etc. The storage media may be shared among the various processors or dedicated to particular processors. In some embodiments, one or more of the processors may be combined with one or more storage media and, possibly other circuitry in a single chip, a single chipset, or disposed on a same circuit board in some embodiments.

The device 100 is capable of communicating with an eNB using cellular interface circuitry 150. The cellular interface circuitry 150 may be a new fifth generation (5G) interface or it may be an enhancement of existing LTE Uu-interface. The device 100 is also able to communicate with other devices in device-to-device mode (also called Peer-to-Peer (P2P) mode) over a proximity services (ProSe) interface circuitry 140. Note that the ProSe interface circuitry 140 may be an enhancement of an existing LTE ProSe PC5 interface, a new ProSe interface defined for 5G systems, a WiFi interface, Bluetooth interface, or an interface for any other version of Wireless Personal Area Networks or Wireless Local Area Networks.

The interface circuitry 140 and 150 may be configured to communicate with other network entities over various interfaces using appropriate networking communication protocols. For example, device-to-device communication by way of the ProSe interface circuitry 140 may be performed in a designated frequency band, such as 5-6 GHz and in accordance with a selected communication protocol suited for such communication. The cellular interface circuitry 150 may be configured to communicate in a different frequency band using a different communication protocol. Either of the interface circuitry 140 or 150 may be capable of communicating using any number of radio access technologies (RATs). In some embodiments, the interface circuitry 140 or 150 may communicate over Ethernet or other computer networking technologies.

The exemplary multi-RAT circuitry 110 includes separation circuitry 120 configured to identify, within a V2X message, first data encoding a priority section of the V2X message and second data encoding a non-priority section of the V2X. For the purposes of this description, the term "section" includes any subset of message data, message fields, message elements, and so on that may be used to refer to different parts or portions of the message. The separation circuitry 120 is configured to generate a priority message that includes the first data and does not include some portion of the message data, (e.g. "the second data"). The separation circuitry 120 is also configured to generate a non-priority message that includes the second data. The separation circuitry 120 may be implemented in the application layer of the device 100 or the adaptation layer, which is the layer between the application layer and the media access control (MAC) layer.

Referring also to FIG. 10, which illustrates a V2X scenario in which device 1 performs message splitting for multi-RAT transmission, the separation circuitry 120 (FIG. 1B) splits V2X MSG 1 into a priority MSG 1 and a non-priority MSG 1. The priority MSG 1 includes parts or sections of the V2X MSG 1 that are more "important" (e.g., safety-related, time-sensitive, mandatory according to some standard, and so on) than parts or sections of the V2X MSG 1 that are deemed "non-priority." The non-priority sections of V2X MSG 1 are included in non-priority MSG 1.

The separation circuitry 120 may determine whether to split a given message based on current communication conditions. For example, if the device 1 is traveling in light traffic and ideal communication conditions, the separation circuitry 120 may refrain from splitting V2X MSG 1 such that no splitting of the V2X MSG 1 is performed by the separation circuitry. However, if transmission of the sections of the V2X message that are classified as non-priority will degrade communication of the priority sections, the separation circuitry 120 may decide to split MSG 1 into priority MSG1 and non-priority MSG1.

The multi-RAT circuitry 110 includes selection circuitry 130 configured to select a priority radio RAT and also select a non-priority RAT. The priority RAT will be used to transmit data encoding the priority message while the non-priority RAT will be used to transmit data encoding the non-priority message. The selection circuitry 130 may be implemented in the application layer of the device 100 or the adaptation layer, which is the layer between the application layer and the media access control (MAC) layer.

The selection circuitry 130 may be configured to select the priority RAT and the non-priority RAT based on characteristics of the priority message and non-priority message. These characteristics, or local data, of the message include the size or quantity of data encoding the message, the type of the message (e.g., mandatory, standard-related, or safety-related), and/or the content of the message (e.g., collision prevention information vs. vehicle condition information), and so on. The selection circuitry 130 may be configured to select the priority RAT and the non-priority RAT based on some communication conditions (e.g., the amount of communication traffic, environmental factors, channel conditions, interference, meteorological conditions, equipment malfunctions, and so on).

For example, if the priority RAT includes mandatory message fields (mandatory being defined as per some standard) but includes a relatively small amount of data, the selection circuitry 130 may select a radio RAT such as DSRC as the priority RAT because radio RATs typically provide low latency for smaller amounts of data. If the non-priority RAT is relatively large and includes non-mandatory information, the selection circuitry 130 may select a cellular RAT such as LTE as the non-priority RAT because cellular RATs typically provide higher quality of service for larger amounts of data.

In some instances, the selection circuitry 130 selects the priority RAT and the non-priority RAT based on RAT capabilities of other devices (e.g., vehicles or RSUs) in the vicinity of the device 100. Thus, the selection circuitry 130 may select a RAT that is common to most or all of the other devices as the priority RAT. The selection circuitry 130 may access information that is shared by the lower stack based on the data received in a common control channel. The common control channel is a section of the safety communication spectrum that is shared by all the RATs (LTE D2D, 5G D2D, 802.11p based radio). One example of the data transmitted by a device on the common channel that can be used by the selection circuitry in the other devices is the type of RATs supported by the device. The selection circuitry in a given device can use the "type of RAT" information transmitted in the common channel by nearby devices to decide which RAT to use to transmit a message.

The selection circuitry 130 may be configured to select the priority RAT based on a default RAT setting (e.g., such as DSRC) such that the priority message is always transmitted via the default RAT setting while the non-priority RAT may be selected based on local data, device RAT capabilities, and/or communication conditions.

The multi-RAT circuitry 130 is configured to control the device 100 to transmit the priority message using the priority RAT (and appropriate interface 140 or 150) and transmit the non-priority message using the non-priority RAT (and appropriate interface 140 or 150).

Figure 1D:
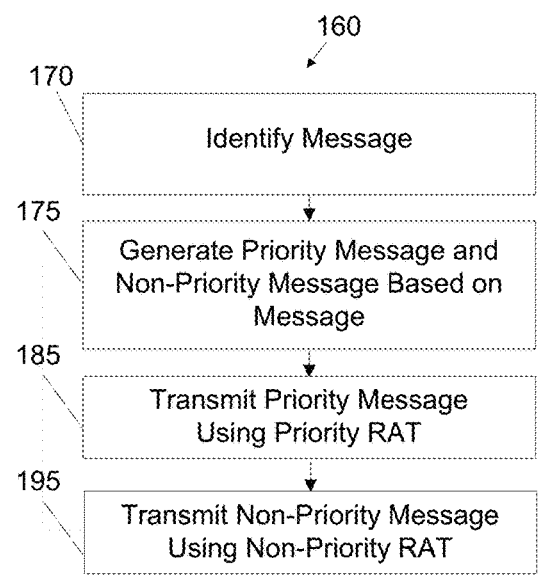
FIG. 1D depicts an exemplary method of performing message splitting for multi-RAT transmission.
Figure 1C:
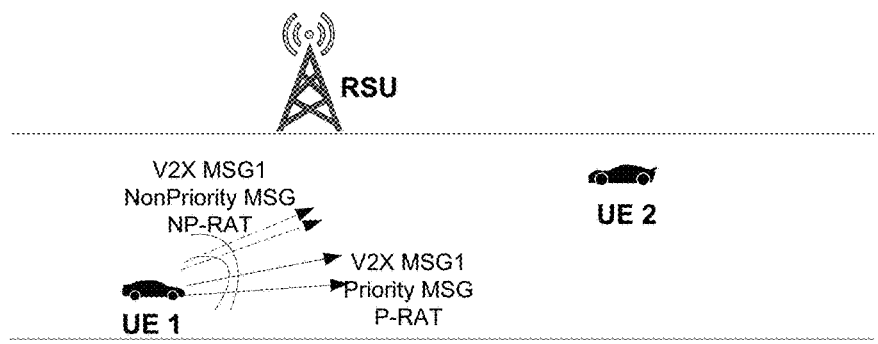
FIG. 1C depicts V2X communication between two groups of vehicles and a RSU in which different RATs are used by each vehicle to transmit a priority V2X message and a non-priority V2X message that resulted from splitting the V2X message of FIG. 1.

FIG. 1D illustrates an exemplary method 160 for message splitting for multi-RAT transmission that may be performed by the multi-RAT circuitry 110 of FIG. 1B. At 170, the method includes identifying a message. AT 175, a priority message and a non-priority message are generated based on the message. At 185 the priority message is transmitted using a priority RAT. At 195 the non-priority message is transmitted using the non-priority RAT. In one example, a default priority RAT is preselected or set for all messages or some messages (such as safety related messages or a BSM).

For example, the default RAT may be DSRC due to its reduced latency. A default non-priority RAT may also be used.

Figure 2A:
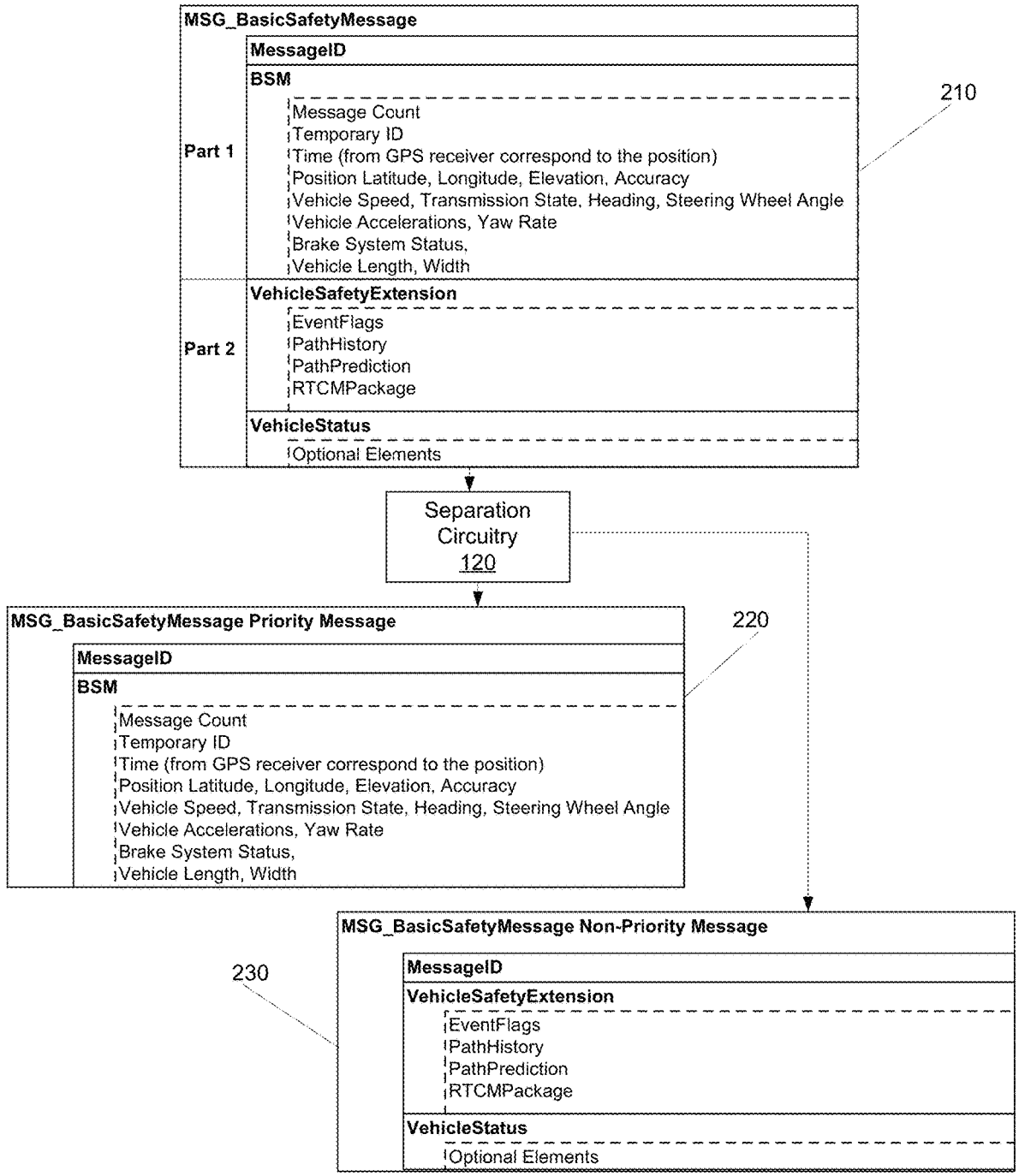
FIG. 2A depicts a first exemplary message splitting of a basic safety message (BSM).
Figure 2B:
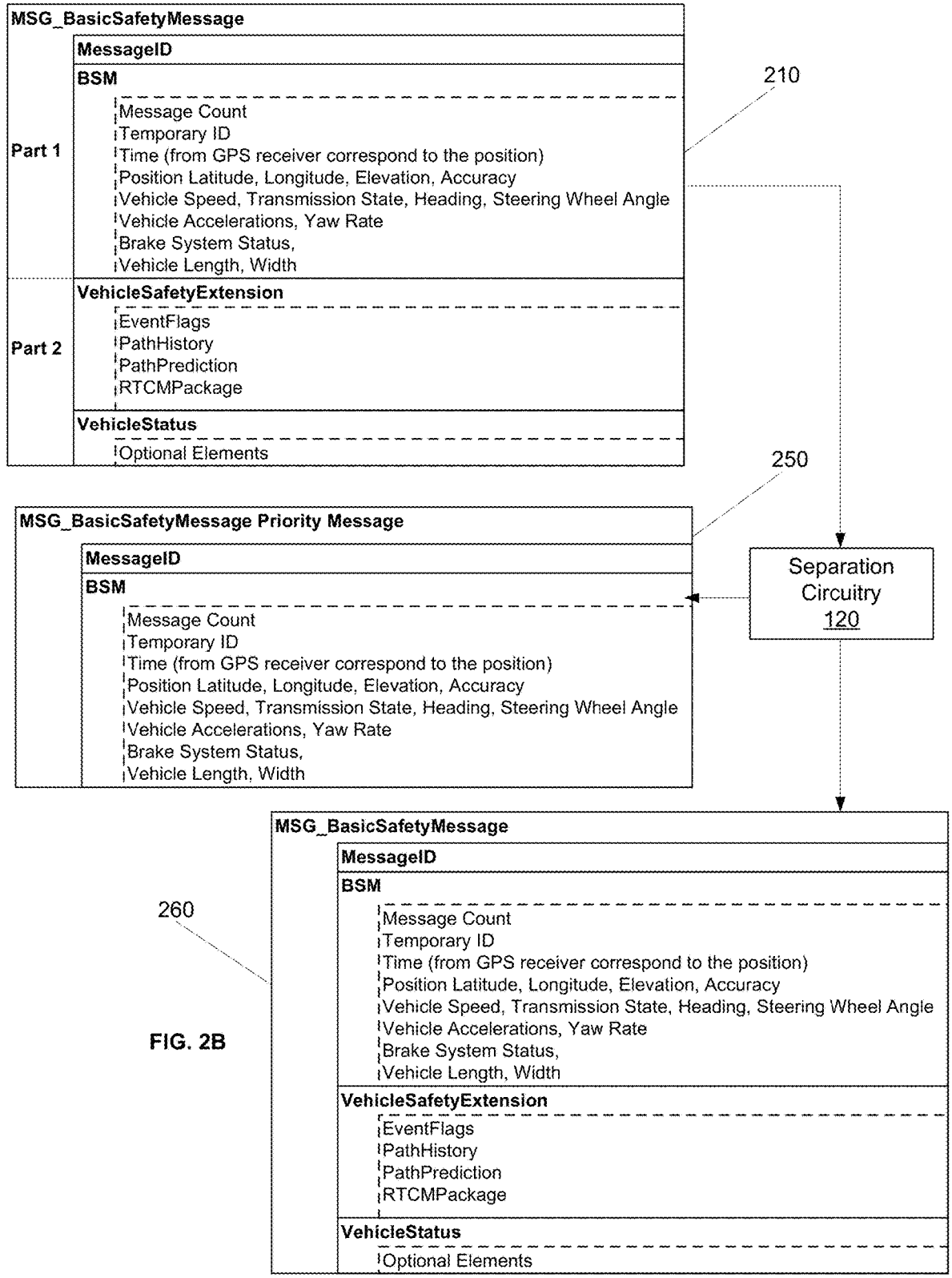
FIG. 2B depicts a second exemplary message splitting of a basic safety message (BSM).
Figure 2C:
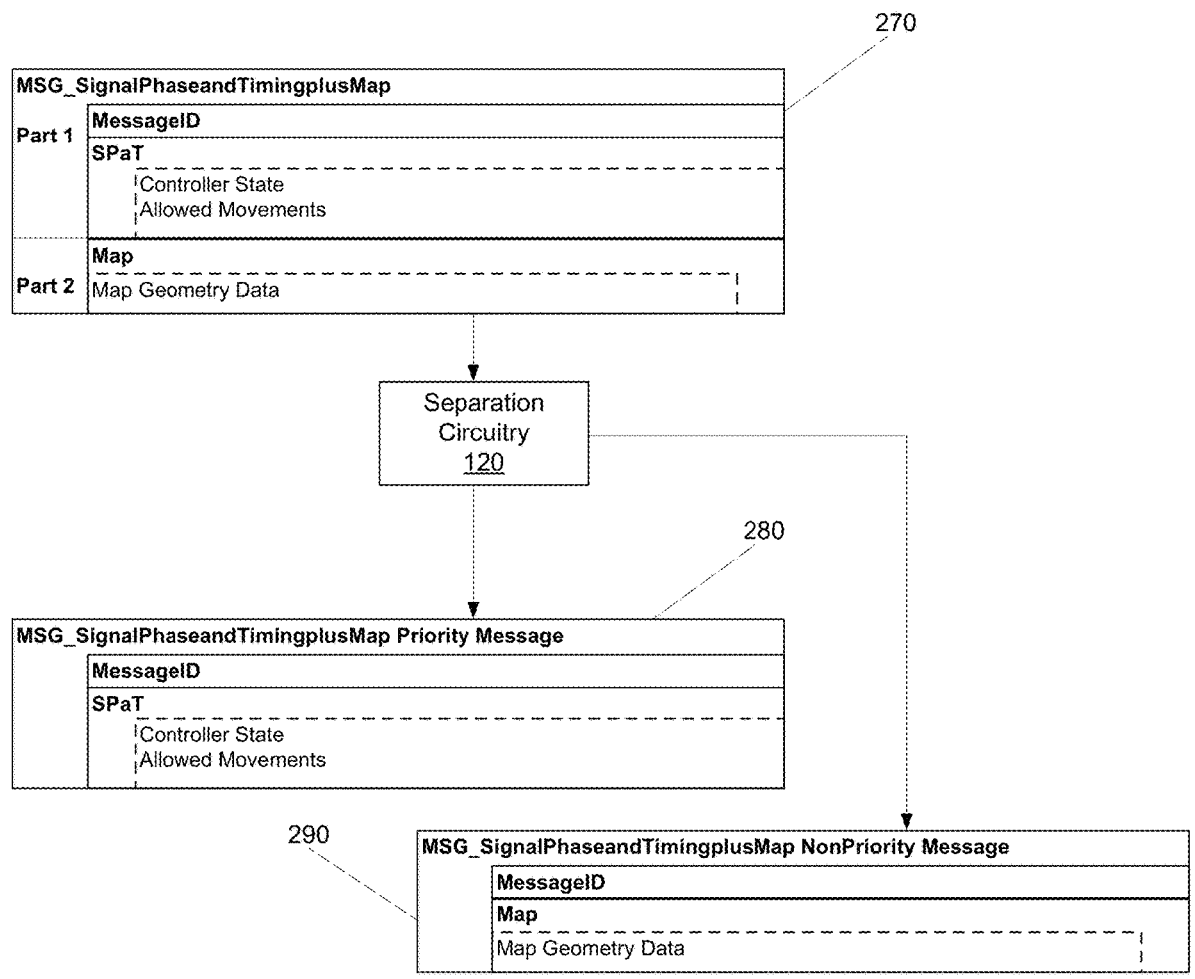
FIG. 2C depicts exemplary message splitting of a signal phase and timing with map (SPAT/MAP) message.

FIGS. 2A-2C illustrate exemplary V2X messages being split into a priority message and a non-priority message by exemplary separation circuitry 120. FIG. 2A illustrates a BSM 210 that includes data encoding a "Part 1" section and data encoding a "Part 2" section. Part 1 includes a message ID and a BSM data section that includes several fields (e.g., message count, temporary id, and so on). Part 2 includes a vehicle safety extension data section that includes several fields (EventFlags, PathHistory, and so on) as well as a vehicle status section that includes fields that store data elements describing a vehicle's status.

The separation circuitry 120 splits the BSM 210 into a priority message 220 and a non-priority message 230. The priority message 220 includes the data encoding Part 1 of the BSM 210. The non-priority message 230 includes the data encoding the message ID as well as the data encoding Part 2 of the BSM 210. Because the original message ID is included in both the priority message and the non-priority message, recipients of the messages are able to associate the two messages with the same original message.

FIG. 2B illustrates an alternative splitting of the BSM 210. In this example, the separation circuitry 120 splits the BSM 210 into a priority message 220 that includes the data encoding Part 1 and a non-priority message 230 that is the same as the original BSM 210. This approach to splitting, in which the priority message includes selected "important" information and the non-priority message includes the entirety of the message is well suited for situations in which the priority part of the message includes critical event information that should be communicated with low latency. The selection circuitry (130, FIG. 1B) may determine that the device has enough LTE capacity to transmit the priority message but not the non-priority message. The selection circuitry can select LTE as the priority RAT and another RAT, such as DSRC, as the non-priority RAT since DSRC does not need to request resources, but instead contends for the DSRC channel.

FIG. 2C illustrates a SPaT/MAP message 270 that shares information about the status of traffic controller equipment (e.g., stoplight) and an upcoming intersection. SPaT/MAP messages are often sent out by traffic control infrastructure (e.g., a device associated with a stoplight) to devices in the vicinity. The SPaT/MAP message 270 includes data encoding a "SPaT" section that predicts the duration and phase of the traffic controller. The SPaT section includes a message ID and a SPaT data section that includes several fields (e.g., controller state, allowed movements, and so on). The SPaT/MAP message 270 includes data encoding a "Map" section. The Map section of the message includes topological lane definition, links between segments, types of lanes, and restrictions on lanes depicted in a high definition map. Thus the Map section includes data encoding map geometry, which will typically involve a relatively large quantity of data.

The separation circuitry 120 splits the SPaT/MAP message 270 into a priority message 280 and a non-priority message 290. The priority message 280 includes the data encoding the SPaT portion of the message 270. The non-priority message 290 includes the data encoding the message ID as well as the data encoding the Map section of the message 270. The selection circuitry (130, FIG. 1B) may select a radio based priority RAT due to better performance and lower latency for the relatively small amount of data in the priority message 280 and a cellular based non-priority RAT to transmit the data intensive Map data in the non-priority message 290 to guarantee any required performance constraints.

It can be seen from the foregoing description that the message splitting for multi-RAT transmission described herein increases reliability and efficiency/performance over single RAT transmission of V2X messages.

Example Device

Figure 3:
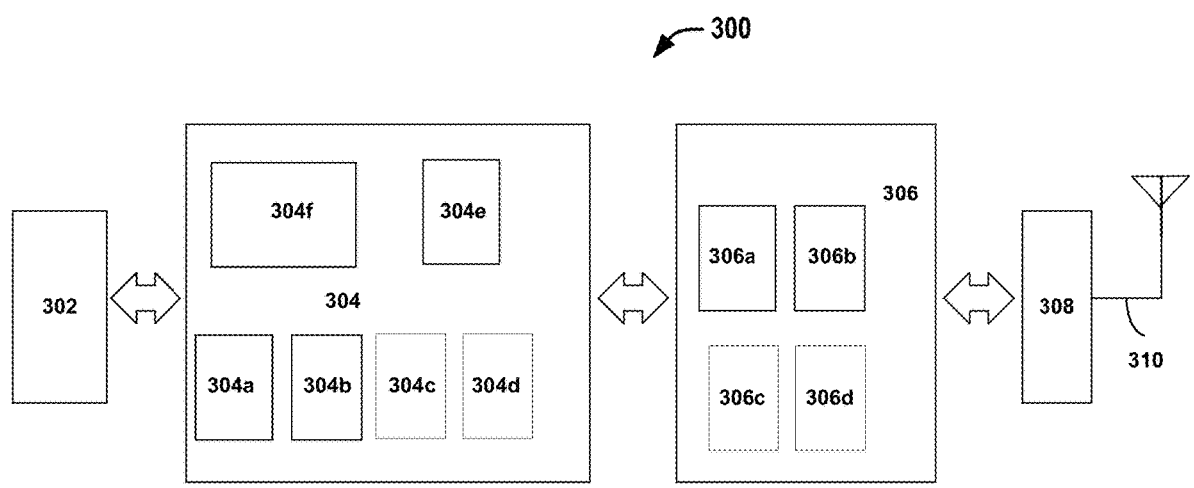
FIG. 3 illustrates example components of a device, according to one embodiment of the disclosure.

Embodiments described herein may be implemented into a system using any suitably configured hardware and/or software. FIG. 3 illustrates, for one embodiment, example components of a device 300. The device 300 may be utilized as a User Equipment (UE) device or an evolved node B (eNB) device or E-UTRAN equipment. In some embodiments, the device 300 may include application circuitry 302, baseband circuitry 304, Radio Frequency (RF) circuitry 306, front-end module (FEM) circuitry 308 and one or more antennas 310, coupled together at least as shown.

The application circuitry 302 may include one or more application processors. For example, the application circuitry 302 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications, such as a VMIMO application as described and/or operating systems to run on the system.

The baseband circuitry 304 may include circuitry such as, but not limited to, one or more single-core or multi-core processors. The baseband circuitry 304 may include one or more baseband processors and/or control logic to process baseband signals received from a receive signal path of the RF circuitry 306 and to generate baseband signals for a transmit signal path of the RF circuitry 306. Baseband processing circuitry 304 may interface with the application circuitry 302 for generation and processing of the baseband signals and for controlling operations of the RF circuitry 306. For example, in some embodiments, the baseband circuitry 304 may include a second generation (2G) baseband processor 304a, third generation (3G) baseband processor 304b, fourth generation (4G) baseband processor 304c, and/or other baseband processor(s) 304d for other existing generations, generations in development or to be developed in the future (e.g., fifth generation (5G), 6G, etc.).

The baseband circuitry 304 (e.g., one or more of baseband processors 304a-d) may handle various radio control functions that enable communication with one or more radio networks via the RF circuitry 306. The radio control functions may include, but are not limited to, signal modulation/demodulation, encoding/decoding, radio frequency shifting, etc. In some embodiments, modulation/demodulation circuitry of the baseband circuitry 304 may include Fast-Fourier Transform (FFT), precoding, and/or constellation mapping/demapping functionality. In some embodiments, encoding/decoding circuitry of the baseband circuitry 304 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 304 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 304e of the baseband circuitry 304 may be configured to run elements of the protocol stack for signaling of the PHY, MAC, RLC, PDCP and/or RRC layers. In some embodiments, the baseband circuitry may include one or more audio digital signal processor(s) (DSP) 304f. The audio DSP(s) 304f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 304 and the application circuitry 302 may be implemented together such as, for example, on a system on a chip (SOC).

In some embodiments, the baseband circuitry 304 may provide for communication compatible with one or more radio technologies. For example, in some embodiments, the baseband circuitry 304 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 304 is configured to support radio communications of more than one wireless protocol may be referred to as multi-mode baseband circuitry.

RF circuitry 306 may enable communication with wireless networks using modulated electromagnetic radiation through a non-solid medium. In various embodiments, the RF circuitry 306 may include switches, filters, amplifiers, etc. to facilitate the communication with the wireless network. RF circuitry 306 may include a receive signal path which may include circuitry to down-convert RF signals received from the FEM circuitry 308 and provide baseband signals to the baseband circuitry 304. RF circuitry 306 may also include a transmit signal path which may include circuitry to up-convert baseband signals provided by the baseband circuitry 304 and provide RF output signals to the FEM circuitry 308 for transmission.

In some embodiments, the RF circuitry 306 may include a receive signal path and a transmit signal path. The receive signal path of the RF circuitry 306 may include mixer circuitry 306a, amplifier circuitry 306b and filter circuitry 306c. The transmit signal path of the RF circuitry 306 may include filter circuitry 306c and mixer circuitry 306a. RF circuitry 306 may also include synthesizer circuitry 306d for synthesizing a frequency for use by the mixer circuitry 306a of the receive signal path and the transmit signal path. In some embodiments, the mixer circuitry 306a of the receive signal path may be configured to down-convert RF signals received from the FEM circuitry 308 based on the synthesized frequency provided by synthesizer circuitry 306d. The amplifier circuitry 306b may be configured to amplify the down-converted signals and the filter circuitry 306c may be a low-pass filter (LPF) or band-pass filter (BPF) configured to remove unwanted signals from the down-converted signals to generate output baseband signals. Output baseband signals may be provided to the baseband circuitry 304 for further processing. In some embodiments, the output baseband signals may be zero-frequency baseband signals, although this is not a requirement. In some embodiments, mixer circuitry 306a of the receive signal path may comprise passive mixers, although the scope of the embodiments is not limited in this respect.

In some embodiments, the mixer circuitry 306a of the transmit signal path may be configured to up-convert input baseband signals based on the synthesized frequency provided by the synthesizer circuitry 306d to generate RF output signals for the FEM circuitry 308. The baseband signals may be provided by the baseband circuitry 304 and may be filtered by filter circuitry 306c. The filter circuitry 306c may include a low-pass filter (LPF), although the scope of the embodiments is not limited in this respect.

In some embodiments, the mixer circuitry 306a of the receive signal path and the mixer circuitry 306a of the transmit signal path may include two or more mixers and may be arranged for quadrature downconversion and/or upconversion respectively. In some embodiments, the mixer circuitry 306a of the receive signal path and the mixer circuitry 306a of the transmit signal path may include two or more mixers and may be arranged for image rejection (e.g., Hartley image rejection). In some embodiments, the mixer circuitry 306a of the receive signal path and the mixer circuitry 306a may be arranged for direct downconversion and/or direct upconversion, respectively. In some embodiments, the mixer circuitry 306a of the receive signal path and the mixer circuitry 306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 306 may include analog-to-digital converter (ADC) and digital-to-analog converter (DAC) circuitry and the baseband circuitry 304 may include a digital baseband interface to communicate with the RF circuitry 306.

In some dual-mode embodiments, a separate radio IC circuitry may be provided for processing signals for each spectrum, although the scope of the embodiments is not limited in this respect.

In some embodiments, the synthesizer circuitry 306d may be a fractional-N synthesizer or a fractional N/N+1 synthesizer, although the scope of the embodiments is not limited in this respect as other types of frequency synthesizers may be suitable. For example, synthesizer circuitry 306d may be a delta-sigma synthesizer, a frequency multiplier, or a synthesizer comprising a phase-locked loop with a frequency divider.

The synthesizer circuitry 306d may be configured to synthesize an output frequency for use by the mixer circuitry 306a of the RF circuitry 306 based on a frequency input and a divider control input. In some embodiments, the synthesizer circuitry 306d may be a fractional N/N+1 synthesizer.

In some embodiments, frequency input may be provided by a voltage controlled oscillator (VCO), although that is not a requirement. Divider control input may be provided by either the baseband circuitry 304 or the applications processor 302 depending on the desired output frequency. In some embodiments, a divider control input (e.g., N) may be determined from a look-up table based on a channel indicated by the applications processor 302.

Synthesizer circuitry 306d of the RF circuitry 306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 306d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 306 may include an IQ/polar converter.

FEM circuitry 308 may include a receive signal path which may include circuitry configured to operate on RF signals received from one or more antennas 310, amplify the received signals and provide the amplified versions of the received signals to the RF circuitry 306 for further processing. FEM circuitry 308 may also include a transmit signal path which may include circuitry configured to amplify signals for transmission provided by the RF circuitry 306 for transmission by one or more of the one or more antennas 310. When used in a device, FEM circuitry 308 may also include a transmit and receive path for device-to-device communications received directly from another device, without traveling through the E-UTRAN (e.g. ProSe interface circuitry). When used in a device, FEM circuitry 308 may also include a transmit and receive path for cellular communications received from the eNB or E-UTRAN (e.g. cellular interface circuitry).

In some embodiments, the FEM circuitry 308 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 906). The transmit signal path of the FEM circuitry 308 may include a power amplifier (PA) to amplify input RF signals (e.g., provided by RF circuitry 306), and one or more filters to generate RF signals for subsequent transmission (e.g., by one or more of the one or more antennas 310.

In some embodiments, the device 300 may include additional elements such as, for example, memory/storage, display, camera, sensor, and/or input/output (I/O) interface.

While the systems, circuitry, and methods have been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

The foregoing description of one or more implementations provides illustration and description, but is not intended to be exhaustive or to limit the scope of the example embodiments to the precise form disclosed. Modifications and variations are possible in light of the above teachings or may be acquired from practice of various implementations of the example embodiments.

Example 1 is a user equipment (UE) device, including separation circuitry, selection circuitry, and multi-RAT circuitry. The separation circuitry is configured to identify within a message, first data comprising a priority section and second data comprising a non-priority section; generate a priority message that includes the first data; and generate a non-priority message that includes the second data. The selection circuitry is configured to select a priority RAT and select a non-priority RAT. The multi-RAT circuitry is configured to instruct a processor of the device to transmit the priority message using the priority RAT and transmit the non-priority message using the non-priority RAT.

Example 2 includes the subject matter of example 1, including or omitting optional elements, wherein the priority RAT is different from the non-priority RAT.

Example 3 includes the subject matter of example 1, including or omitting optional elements, wherein the separation circuitry is configured to generate a non-priority message that includes both the first data and the second data.

Example 4 includes the subject matter of example 1, including or omitting optional elements, wherein the separation circuitry is configured to identify the message as a basic safety message (BSM) and, in response: generate a priority message that includes first data comprising BSM Part 1 fields of the message; and generate a non-priority message that includes second data comprising BSM Part 2 fields of the message.

Example 5 includes the subject matter of example 1, including or omitting optional elements, wherein the separation circuitry is configured to: identify the message as a signal phase and timing with map (SPAT/MAP) message, and in response: generate a priority message that includes first data comprising SPaT fields of the message; and generate a non-priority message that includes second data comprising MAP fields of the message.

Example 6 includes the subject matter of examples 1-5, including or omitting optional elements, wherein the selection circuitry is configured to select the priority RAT and the non-priority RAT based at least on one or more characteristics of the message.

Example 7 includes the subject matter of examples 1-5, including or omitting optional elements, wherein the selection circuitry is configured to select the priority RAT and the non-priority RAT based at least on RAT capabilities of other devices in proximity to the device.

Example 8 includes the subject matter of example 7, including or omitting optional elements, wherein the selection circuitry is configured to: monitor a common control channel used by the other devices; and determine RAT capabilities of each of the other devices based at least on RAT capabilities advertised by the other devices in the common control channel.

Example 9 is a method, including: identifying, within a message, first data comprising a priority section and second data comprising a non-priority section; generating a priority message that includes the first data; transmitting the priority message using a priority RAT; generating a non-priority message that includes the second data; and transmitting the non-priority message using a non-priority RAT.

Example 10 includes the subject matter of example 9, including or omitting optional elements, including identifying the message as a basic safety message (BSM) and, in response: generating a priority message that includes first data comprising BSM Part 1 fields of the message; and generating a non-priority message that includes second data comprising BSM Part 2 fields of the message.

Example 11 includes the subject matter of example 10, including or omitting optional elements, including selecting dedicated short range communication (DSRC) as the priority RAT in response to determining that the message is a basic safety message.

Example 12 includes the subject matter of example 9, including or omitting optional elements, including identifying the message as a signal phase and timing with map (SPAT/MAP) message, and in response: generating a priority message that includes first data comprising SPaT fields of the message; and generating a non-priority message that includes second data comprising MAP fields of the message.

Example 13 includes the subject matter of examples 9-12, including or omitting optional elements, including selecting the priority RAT and the non-priority RAT based at least on one or more characteristics of the message.

Example 14 includes the subject matter of examples 9-12, including or omitting optional elements, including selecting the priority RAT and the non-priority RAT based at least on RAT capabilities of proximate devices.

Example 12 includes the subject matter of example 14, including or omitting optional elements, including monitoring a common control channel used by the proximate devices; and determining the RAT capabilities of each of the proximate devices based at least on RAT capabilities advertised by the proximate devices in the common control channel.

Example 16 includes the subject matter of examples 9-12, including or omitting optional elements, including selecting the priority RAT and the non-priority RAT based at least on present communication conditions.

Example 17 includes the subject matter of examples 9-12, including or omitting optional elements, including selecting the priority RAT and the non-priority RAT based at least on a default selection for priority RAT.

Example 18 is a computer-readable storage device storing computer-executable instructions that, in response to execution, cause a processor to: identify, within a message, first data comprising a priority section and second data comprising a non-priority section; generate a priority message that includes the first data; transmit the priority message using a priority RAT; generate a non-priority message that includes the second data; and transmit the non-priority message using a non-priority RAT.

Example 19 includes the subject matter of example 18, including or omitting optional elements, including computer-executable instructions that, in response to execution, cause the processor to select the priority RAT and the non-priority RAT based at least on one or more characteristics of the message.

Example 20 includes the subject matter of example 18, including or omitting optional elements, including computer-executable instructions that, in response to execution, cause the processor to select the priority RAT and the non-priority RAT based at least on RAT capabilities of other devices in proximity to the device.

Example 21 includes the subject matter of example 20, including or omitting optional elements, including computer-executable instructions that, in response to execution, cause the processor to: monitor a common control channel used by the other devices; and determine RAT capabilities of each of the other devices based at least on RAT capabilities advertised by the other devices in the common control channel.

Example 22 includes the subject matter of example 18, including or omitting optional elements, including computer-executable instructions that, in response to execution, cause the processor to select the priority RAT and the non-priority RAT based at least on present communication conditions.

Example 23 includes the subject matter of example 18, including or omitting optional elements, including computer-executable instructions that, in response to execution, cause the processor to select the priority RAT based on a default selection.

Example 24 is an apparatus, including: means for identifying, within a message, first data comprising a priority section and second data comprising a non-priority section; means for generating a priority message that includes the first data; means for transmitting the priority message using a priority RAT; means for generating a non-priority message that includes the second data; and means for transmitting the non-priority message using a non-priority RAT.

Example 25 includes the subject matter of example 24, including or omitting optional elements, including means for selecting the priority RAT and the non-priority RAT based at least on one or more of: characteristics of the message, RAT capabilities of proximate devices, present communication conditions, or a default selection.

The invention claimed is:

1. A user equipment (UE) device, comprising:
   separation circuitry configured to:
      identify within a message, first data comprising a priority section and second data comprising a non-priority section;
      generate a priority message that comprises the first data; and
      generate a non-priority message that comprises the second data;
   selection circuitry configured to:
      select a priority radio access technology (RAT) among a plurality of RATs that the UE device supports, wherein an RAT is a communication protocol according to a specific communication standard; and
      select a non-priority RAT among the plurality of RATs, wherein the non-priority RAT and the priority RAT are different RATs and the priority RAT is selected based on a default RAT setting and the non-priority RAT is selected based on RAT capabilities of devices in a vicinity of the UE device or a communication condition; and
   multi-RAT circuitry configured to instruct a processor of the UE device to:
      transmit the priority message using the priority RAT; and
      transmit the non-priority message using the non-priority RAT.

2. The UE device of claim 1, wherein the priority RAT is different from the non-priority RAT.

3. The UE device of claim 1, wherein the separation circuitry is configured to generate a non-priority message that comprises both the first data and the second data.

4. The UE device of claim 1, wherein the separation circuitry is configured to identify that the message is a basic safety message (BSM) and, in response:
   generate a priority message that comprises first data comprising BSM Part 1 fields of the message; and
   generate a non-priority message that comprises second data comprising BSM Part 2 fields of the message.

5. The UE device of claim 1, wherein the separation circuitry is configured to:
   identify that the message is a signal phase and timing with map (SPAT/MAP) message, and in response:
      generate a priority message that comprises first data comprising SPaT fields of the message; and
      generate a non-priority message that comprises second data comprising MAP fields of the message.

6. The UE device of claim 1, wherein the selection circuitry is configured to select the priority RAT and the non-priority RAT based at least on one or more characteristics of the message.

7. The UE device of claim 1, wherein the selection circuitry is configured to select the priority RAT and the non-priority RAT based at least on RAT capabilities of other UE devices in proximity to the UE device.

8. The UE device of claim 7, wherein the selection circuitry is configured to:
   monitor a common control channel used by the other UE devices; and
   determine RAT capabilities of each of the other UE devices based at least on RAT capabilities advertised by the other UE devices in the common control channel.

9. A method configured to transmit a message using multiple radio access technologies (RATs), comprising:
   identifying, within a message, first data comprising a priority section and second data comprising a non-priority section;
   generating a priority message that comprises the first data;
   transmitting the priority message using a priority RAT, wherein an RAT is a communication protocol according to a specific communication standard;
   generating a non-priority message that comprises the second data; and
   transmitting the non-priority message using a non-priority RAT, wherein the non-priority RAT and the priority RAT are different RATs, and the priority RAT is selected among a plurality of RATs supported by a user equipment (UE) device based on a default RAT setting and the non-priority RAT is selected among the plurality of RATs based on RAT capabilities of devices in a vicinity of the UE device or a communication condition.

10. The method of claim 9, further comprising identifying that the message is a basic safety message (BSM) and, in response:
   generating a priority message that comprises first data comprising BSM Part 1 fields of the message; and
   generating a non-priority message that comprises second data comprising BSM Part 2 fields of the message.

11. The method of claim 10, further comprising selecting dedicated short range communication (DSRC) as the priority RAT in response to determining that the message is a basic safety message.

12. The method of claim 9, further comprising identifying that the message is a signal phase and timing with map (SPAT/MAP) message, and in response:
generating a priority message that comprises first data comprising SPaT fields of the message; and
generating a non-priority message that comprises second data comprising MAP fields of the message.

13. The method of claim 9, further comprising selecting the priority RAT and the non-priority RAT based at least on one or more characteristics of the message.

14. The method of claim 9, further comprising selecting the priority RAT and the non-priority RAT based at least on RAT capabilities of proximate UE devices.

15. The method of claim 14, further comprising:
monitoring a common control channel used by the proximate UE devices; and
determining the RAT capabilities of each of the proximate UE devices based at least on RAT capabilities advertised by the proximate UE devices in the common control channel.

16. The method of claim 9, further comprising selecting the priority RAT and the non-priority RAT based at least on present communication conditions.

17. The method of claim 9, further comprising selecting the priority RAT and the non-priority RAT based at least on a default selection for priority RAT.

18. A non-transitory computer-readable storage device storing computer-executable instructions that, in response to execution, cause a processor to:
identify, within a message, first data comprising a priority section and second data comprising a non-priority section;
generate a priority message that comprises the first data;
transmit the priority message using a priority RAT, wherein an RAT is a communication protocol according to a specific communication standard;
generate a non-priority message that comprises the second data; and
transmit the non-priority message using a non-priority RAT, wherein the non-priority RAT and the priority RAT are different RATs, and the priority RAT is selected among a plurality of RATs supported by a user equipment (UE) device based on a default RAT setting and the non-priority RAT is selected among the plurality of RATs based on RAT capabilities of devices in a vicinity of the UE device or a communication condition.

19. The non-transitory computer-readable storage device of claim 18, further storing computer-executable instructions that, in response to execution, cause the processor to select the priority RAT and the non-priority RAT based at least on one or more characteristics of the message.

20. The non-transitory computer-readable storage device of claim 18, further storing computer-executable instructions that, in response to execution, cause the processor to select the priority RAT and the non-priority RAT based at least on RAT capabilities of other UE devices in proximity to the UE device.

21. The non-transitory computer-readable storage device of claim 20, further storing computer-executable instructions that, in response to execution, cause the processor to:
monitor a common control channel used by the other UE devices; and
determine RAT capabilities of each of the other UE devices based at least on RAT capabilities advertised by the other UE devices in the common control channel.

22. The non-transitory computer-readable storage device of claim 18, further storing computer-executable instructions that, in response to execution, cause the processor to select the priority RAT and the non-priority RAT based at least on present communication conditions.

23. The non-transitory computer-readable storage device of claim 18, further storing computer-executable instructions that, in response to execution, cause the processor to select the priority RAT based on a default selection.

\* \* \* \* \*